US 6,673,859 B2

(12) United States Patent
Ladd et al.

(10) Patent No.: US 6,673,859 B2
(45) Date of Patent: *Jan. 6, 2004

(54) MULTI-LAYERED GOLF BALL AND COMPOSITION

(75) Inventors: Derek A. Ladd, New Bedford, MA (US); Jeffrey L. Dalton, North Dartmouth, MA (US); Murali Rajagopalan, South Dartmouth, MA (US); Kevin M. Harris, New Bedford, MA (US); Christopher Cavallaro, Lakeville, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/051,121

(22) Filed: Jan. 22, 2002

(65) Prior Publication Data

US 2002/0086931 A1 Jul. 4, 2002

Related U.S. Application Data

(63) Continuation of application No. 09/404,146, filed on Sep. 27, 1999, now Pat. No. 6,355,715, which is a continuation-in-part of application No. 08/996,718, filed on Dec. 23, 1997, now Pat. No. 6,124,389, which is a continuation-in-part of application No. 08/603,057, filed on Feb. 16, 1996, now Pat. No. 5,759,676, which is a continuation-in-part of application No. 08/482,522, filed on Jun. 7, 1995, now Pat. No. 5,688,191.

(51) Int. Cl.$^7$ .................. A63B 37/12; A63B 37/00; C08L 75/08

(52) U.S. Cl. .............. 524/432; 525/424; 525/440; 473/374; 473/378

(58) Field of Search .............. 524/432; 525/424, 525/440; 473/374, 378

(56) References Cited

U.S. PATENT DOCUMENTS

| | | | |
|---|---|---|---|
| 4,141,559 A | 2/1979 | Melvin et al. ............. 473/372 |
| 4,431,193 A | 2/1984 | Nesbitt ................ 273/235 R |
| 4,625,964 A | 12/1986 | Yamada ................... 273/62 |
| 4,650,193 A | 3/1987 | Molitor et al. ............. 273/228 |
| 4,674,751 A | 6/1987 | Molitor et al. ............. 473/385 |
| 4,714,253 A | 12/1987 | Nakahara et al. .......... 273/228 |
| 4,848,770 A | 7/1989 | Shama ................... 273/228 |
| 4,863,167 A | 9/1989 | Matsuki et al. ............. 273/62 |
| 4,919,434 A | 4/1990 | Saito ................... 273/235 |
| 5,002,281 A | 3/1991 | Nakahara et al. .......... 273/220 |
| 5,072,944 A | 12/1991 | Nakahara et al. .......... 273/220 |
| 5,184,828 A | 2/1993 | Kim et al. ................ 273/228 |
| 5,253,871 A | 10/1993 | Viollaz .................. 273/228 |
| 5,314,187 A | 5/1994 | Proudfit ............... 273/235 R |
| 5,439,227 A | 8/1995 | Egashira et al. ........... 273/228 |
| 5,556,098 A | 9/1996 | Higuchi et al. ............ 473/373 |
| 5,681,898 A | 10/1997 | Pocklington .............. 525/193 |
| 5,688,191 A | 11/1997 | Cavallaro et al. .......... 473/373 |
| 5,759,676 A | 6/1998 | Cavallaro et al. .......... 428/215 |
| 5,810,678 A | 9/1998 | Cavallaro et al. .......... 473/373 |
| 5,813,923 A | 9/1998 | Cavallaro et al. .......... 473/373 |
| 5,816,937 A | 10/1998 | Shimosaka et al. ......... 473/354 |
| 5,885,172 A | 3/1999 | Hebert et al. ............. 473/354 |
| 5,929,189 A | 7/1999 | Ichikawa et al. ............ 528/76 |
| 5,947,842 A | 9/1999 | Cavallaro et al. .......... 473/373 |
| 5,965,669 A | 10/1999 | Cavallaro et al. .......... 525/221 |
| 5,971,870 A | * 10/1999 | Sullivan |
| 6,124,389 A | 9/2000 | Cavallaro et al. .......... 524/432 |
| 6,129,640 A | 10/2000 | Higuchi et al. ............ 473/374 |
| 6,132,324 A | 10/2000 | Hebert et al. ............. 473/378 |
| 6,290,611 B1 | 9/2001 | Rajagopalan et al. ....... 473/371 |
| 6,315,680 B1 | 11/2001 | Dalton et al. ............. 473/373 |
| 6,355,715 B1 | * 3/2002 | Ladd |

FOREIGN PATENT DOCUMENTS

GB 2 335 368 A 9/1999

* cited by examiner

Primary Examiner—David J. Buttner
(74) Attorney, Agent, or Firm—Swidler Berlin Shereff Friedman, LLP

(57) ABSTRACT

The present invention is directed towards a multi-layer golf ball which comprises a core, a cover layer and at least one intermediate layer disposed between the core and cover, wherein the intermediate layer comprises a polyether-type polyurethane and optionally, a second thermoplastic component such as polyetherester block copolymer, polyester-ester block copolymer, polyetheramide block copolymer, dynamically vulcanized thermoplastic elastomer, functionalized styrene-butadiene elastomer, thermoplastic polyurethane, thermoplastic polyesters, metallocene polymer or blends thereof and a density-modifying filler such as zinc oxide, titanium dioxide or blends thereof.

14 Claims, 1 Drawing Sheet

MULTI-LAYERED GOLF BALL AND COMPOSITION

CROSS-REFERENCE TO RELATED APPLICATIONS

This application is a continuation of U.S. patent application Ser. No. 09/404,146, filed Sep. 27, 1999, now U.S. Pat. No. 6,355,715, issued Mar. 12, 2002, which is a continuation-in-part of U.S. patent application Ser. No. 08/996,718, filed on Dec. 23, 1997, now U.S. Pat. No. 6,124,389, which is a continuation-in-part of U.S. patent application Ser. No. 08/603,057, filed on Feb. 16, 1996, now U.S. Pat. No. 5,759,676, which is a continuation-in-part of U.S. patent application Ser. No. 08/482,522, filed Jun. 7, 1995, now U.S. Pat. No. 5,688,191. The entire disclosures of these applications are incorporated by reference herein.

FIELD OF THE INVENTION

This invention relates generally to golf balls, and more specifically, to a multi-layer golf ball and a composition therefore. In particular, this invention relates to a golf ball having a core, a cover and at least one intermediate layer disposed between the core and cover, wherein the cover or intermediate layer is formed from a blend comprising polyether-type thermoplastic polyurethane. The multi-layer golf balls of the present invention have been found to provide good distance, durability, and desirable playing characteristics.

BACKGROUND OF THE INVENTION

Conventional golf balls can be divided into two general types or groups: solid balls or wound balls. The difference in play characteristics resulting from these different types of constructions can be quite significant.

Balls having a solid construction are generally most popular with the average recreational golfer because they provide a very durable ball while also providing maximum distance. Solid balls are made with a solid core, usually formed of a crosslinked rubber, which is encased by a cover material. Typically the solid core is formed of polybutadiene which is chemically crosslinked with zinc diacrylate and/or similar crosslinking agents and is covered by a tough, cut-proof blended cover. The cover is generally formed of a material such as SURLYN, which is a trademark for an ionomer resin produced by DuPont of Wilmington, Del. The combination of the core and cover materials provide a ball that is virtually indestructible by golfers. Further, such a combination imparts a high initial velocity to the ball which results in improved distance. Because the materials of which the ball is formed are very rigid, solid balls generally have a hard "feel" when struck with a club. Likewise, due to their hardness, these balls have a relatively low spin rate which provides greater distance.

At the present time, the wound ball remains the preferred ball of more advanced players due to its spin and feel characteristics. Wound balls typically have either a solid rubber or liquid center core around which many yards of a stretched elastic thread or yarn are wound. The wound core is then covered with a durable cover material such as a SURLYN or similar material or a softer cover such as balata or polyurethane. Wound balls are generally softer and provide more spin than non-wound balls, which enables a skilled golfer to have more control over the ball's flight and final position. Particularly, with approach shots into the green, the high spin rate of soft, wound balls enables the golfer to stop the ball very near its landing position.

A number of patents have been issued that are directed towards modifying the properties of a conventional solid ball by altering the typical single layer core and single cover layer construction to provide a multi-layer ball having such as a dual cover layer, dual core layer and/or a ball having a mantle layer disposed between the cover and the core. The inventions disclosed in the prior art patents are directed towards improving a variety of golf balls physical properties that help determine "in-play" characteristics.

Several patents are directed towards improving the carry distance of such balls. For example, U.S. Pat. No. 4,863,167 relates to a three piece solid golf ball having increased flight distance, wherein the ball has a center portion and an outer layer formed from a rubber composition, wherein the outer layer is harder than the center portion and further contains a gravity-adjusting filler so as to impart a higher specific gravity to the outer layer than that of the center portion. U.S. Pat. No. 5,184,828 relates to a solid three-piece golf ball having improved rebound characteristics and carry distance while maintaining an adequate spin rate, wherein these characteristics are allegedly obtained by controlling the size of the polybutadiene inner core and outer layer as well as their specific gravity and hardness. According to the '828 patent, the key to obtaining the desired rebound characteristics is that the maximum hardness (42–62 Shore D) must be located at the interface between the core and the mantle and the hardness must then decrease both inwardly and outwardly. U.S. Pat. No. 4,714,253 is also directed towards a three-piece golf ball having an improved rebound coefficient. This golf ball has a core with a Shore C hardness of 57–80 in its center, but not more than 83 at a distance between 5–10 mm from its center and an outer layer with a Shore C hardness of 70–83.

Additionally, there are a number of patents directed towards improving the spin and feel of solid balls while maintaining the distance provided by the solid construction. For example, U.S. Pat. No. 5,072,944 discloses a three-piece solid golf ball having a center layer and an outer layer that are prepared from a rubber composition, wherein it is desirable that the center core layer is softer than the outer layer, the layers having a hardness (Shore C) of 25–50 and 70–90, respectively.

U.S. Pat. No. 4,625,964 relates to a solid golf ball having a polybutadiene rubber core of a diameter not more than 32 mm, a polybutadiene rubber intermediate layer having a specific gravity of lower than that of the core material, and a cover. U.S. Pat. No. 4,650,193 is directed towards a solid golf ball having a core comprising a central portion and an integral outer layer, wherein the core is a curable elastomer such as polybutadiene which is treated with a cure altering agent to soften an outer layer of the core, to produce a central layer with a hardness (Shore C) of greater than 75 and an outer layer with a hardness (Shore A) of less than 80.

U.S. Pat. No. 4,848,770 discloses a solid three-piece golf ball which includes a core of a highly filled synthetic rubber or polymeric material, an intermediate mantle of an unfilled synthetic rubber and a cover. The core and intermediate mantle have a hardness of between 50–95 Shore D. U.S. Pat. No. 5,002,281 is directed towards a three-piece solid golf ball which has an inner core having a hardness of 25–70 (Shore C), an outer shell having a hardness of 80–95 (Shore C) and a cover. Further, the specific gravity of the inner core must be greater than 1.0, but less than or equal to that of the outer shell, which must be less than 1.3.

The prior art discloses a variety of materials other than polybutadiene for use as intermediate layers. For example, U.S. Pat. No. 5,253,871 concerns a golf ball having a three-piece structure comprising an elastomer core, an intermediate layer of a thermoplastic material containing at least 10% of etheramide block copolymer, preferably blended with an ionomer, and a thermoplastic cover. U.S. Pat. No. 5,681,898 is directed to a multilayer golf ball having a conventional polybutadiene core, an ionomer cover and an intermediate layer formed from a blend of an ethylene methacrylic acid copolymer and a vulcanizate formed from polybutadiene and a peroxide curing agent.

U.S. Pat. Nos. 5,439,227 and 5,556,098 both disclose multilayer golf balls which have a conventional polybutadiene core, conventional covers and an intermediate layer formed from a polyetherester block copolymer blended with an ionomer.

Further, there are also several patents which are directed to golf balls having multiple cover layers. For example U.S. Pat. No. 4,431,193 relates to a golf ball having a multilayer cover wherein the inner layer is a hard, high flexural modulus ionomer resin and the outer layer is a soft, low flexural modulus ionomer resin, and wherein either or both layers may comprise a foamed ionomer resin. U.S. Pat. No. 5,314,187 also relates to golf balls having a multiple layer cover, wherein the outer layer is molded over the inner layer and comprises a blend of balata and an elastomer and the inner layer is an ionomer resin. U.S. Pat. No. 4,919,434 is directed towards a golf ball having a cover which comprises an inner layer and an outer layer, each of which comprise a thermoplastic resin. Preferably the layers are comprised of materials that are capable of bonding with each other, for example, by heat, or by other means which are readily known to one of ordinary skill in the art.

U.S. Pat. No. 5,813,923 discloses a golf ball having a core and a cover with an intermediate layer having a flexural modulus of less than 10,000 psi. The core has a compression of less than 70 and the cover has a flexural modulus of greater than 75,000 psi.

However, none of the patents discussed above disclose the multi-layer ball of the current invention that employs the materials, and has the improved golf ball properties, as disclosed herein.

SUMMARY OF THE INVENTION

The present invention is directed towards an improved multi-layer golf ball which includes a core having a compression of no greater than about 90, a cover having at least one layer being formed from a blend including a polyether-type thermoplastic polyurethane having a percent rebound resilience of greater than 60 such that the golf ball has a coefficient of restitution of greater than about 0.76.

In one embodiment, the blend further includes a second component, wherein the second component is a thermoplastic material. In another embodiment, the second component is selected from the group consisting of polyetherester block copolymers, polyesterester block copolymers, polyetheramide block copolymers, dynamically vulcanized thermoplastic elastomers, styrene-butadiene elastomers, other thermoplastic polyurethanes, thermoplastic polyesters, polymers formed using a metallocene catalyst, and blends thereof. Preferably, the second component is a polyetherester block copolymer. In another embodiment, the blend further includes a density adjusting filler in an amount sufficient to provide the at least one layer with a specific gravity of greater than about 1.2. In still another embodiment, the layer has a specific gravity of greater than about 1.25. Preferably, the density adjusting filler includes zinc oxide.

In another embodiment, the golf ball is comprised of a core, a cover and intermediate layer disposed there between. The intermediate layer is comprised of a blend of a polyether-type polyurethane having a percent rebound resilience of greater than 60 percent and another thermoplastic material. In a preferred embodiment, the blend includes about 20 to about 90 percent by weight polyether-type thermoplastic polyurethane, about 5 to 50 percent by weight second thermoplastic component and about 5 to about 40 percent by weight density adjusting filler. Preferably, the blend includes about 30 to 60 percent by weight polyether-type thermoplastic polyurethane having a percent rebound resilience of greater than 60, about 20 to 40 percent by weight second thermoplastic component and about 15 to 30 percent by weight density adjusting filler.

In another embodiment, the golf ball is comprised of a core, a cover and intermediate layer disposed there between. The intermediate layer has a Shore D hardness of about 25 to 50 and a flexural modulus of about 1,000 psi to 8,000 psi and is formed from greater than 50% pph of a polyether-type thermoplastic polyurethane. In another embodiment, the golf ball has a compression of no greater than about 90. In still another embodiment, the cover includes at least one of a thermoplastic or a thermoset material.

The present invention is also directed to a golf ball having a core including polybutadiene, a cover layer having a Shore D hardness of about 54 to 72, and at least one intermediate layer disposed between the cover and the core, wherein the at least one intermediate layer is formed from a blend including about 40 to 60 weight percent of a polyether-type thermoplastic polyurethane having a percent rebound resilience of greater than 60, about 15 to 30 weight percent of a density increasing or decreasing filler such as zinc oxide or barium sulfate or foaming agents or microspheres, from about 20 to about 40 weight percent polyetherester or polyesterester block copolymer; and wherein the golf ball has a coefficient of restitution of greater than about 0.78.

In one embodiment, the intermediate layer is formed from a blend including about 45 to 50 weight percent polyether-type thermoplastic polyurethane, about 18 to 22 weight percent zinc oxide, and about 30 to 35 weight percent polyetherester or polyesterester block copolymer. In another embodiment, the intermediate layer has a Shore D hardness of less than about 40 and a flexural modulus of less than about 10,000 psi.

The present invention is also directed to a golf ball having a coefficient of restitution of greater than about 0.78 and a compression of at least about 50 and less than 90, wherein the ball includes a core and a cover having at least an inner or an outer layer disposed concentrically about the core, wherein the layer is a composition including a polyether-type polyurethane derived from a diisocyanate reacted with a hydroxyl terminated polyether and a glycol chain extender composition. Preferably, the polyether-type polyurethane is blended with a thermoplastic selected from the group of homo and copolyesters, homo and co-polyamides, polyetherester block copolymers, polyesterester block copolymers, polyetheramide block copolymers, polyesteramide block copolymers, and other polyurethanes. The hydroxyl terminated polyether has alkylene oxide repeat units containing from 2 to 6 carbon atoms and a weight average molecular weight of at least 1,400. For a cover inner layer, the resultant material preferably has a flexural modulus less than 20,000 psi.

The present invention is also directed to a golf ball have a core comprised of a thermoset polybutadiene-rubber based material and a cover having an inner layer and an outer layer. The inner layer is particularly comprised of an injection moldable polyurethane having a percent rebound resilience of greater than 65 and a flexural modulus of less than 10,000 psi such that the ball has soft feel due to the low flexural modulus, a good initial velocity due to the high coefficient of restitution and is easy to manufacture since the inner layer is injection moldable. Even more preferably, the cover inner layer is injection molded at a temperature of less than 400° F. Most preferably, the ball is manufactured by compression molding the core, injection molding the cover inner layer at a temperature of less than 400° F. and compression or injection molding the cover outer layer from a thermoplastic material.

In another embodiment, the inner layer has a first hardness and the outer layer has a second hardness greater than the first hardness. When the cover hardness is greater than the inner layer and has a flexural modulus of greater than 60,000 psi, the ball will exhibit low spin off of the driver for excellent distance. In still another embodiment, the core has a third hardness within 10 Shore D of the cover inner layer hardness and less than the cover outer layer hardness. The softer core and cover inner layer contribute to the balls soft feel as well as low driver spin. In another embodiment, the inner layer has a specific gravity greater than about 1.2 for an increased moment of inertia.

DETAILED DESCRIPTION OF THE INVENTION

Figure 1:
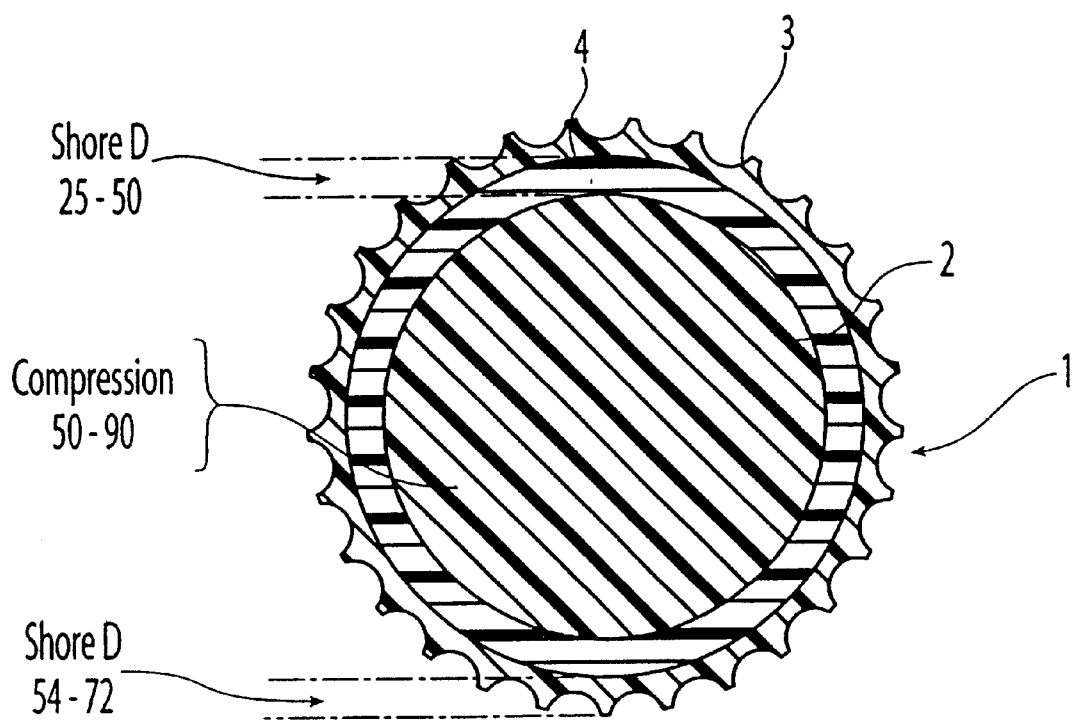
FIG. 1 is a cross-sectional view of one embodiment of a golf ball according to the present invention.

The following terms that are used in this application are defined in terms of the enumerated ASTM tests: Specific Gravity ASTM D-297, Flexural (Flex) Modulus ASTM D-790, Shore D Hardness ASTM D-2240, and Shore C Hardness ASTM D-2240. The ASTM D-297 test was carried out in lab conditions where the temperature was controlled to 20–23° C.

As used herein, the terms "points" or "compression points" refer to the compression scale or the compression scale based on the ATTI Engineering Compression Tester. This scale, which is well known to those working in this field, is used in determining the relative compression of a core or ball.

As used herein the percent rebound resilience is the measure of the rebound height of a plunger using the rebound apparatus according to ASTM-2632-92.

As used herein, "COR" refers to Coefficient of Restitution, which is obtained by dividing a ball's rebound velocity by its initial (i.e. incoming) velocity. A golf ball having a high COR dissipates a smaller fraction of its total energy when colliding with the plate and rebounding therefrom than does a ball with a lower COR. The COR values reported herein, are obtained by firing the object at a steel plate at an incoming velocity of 125 ft./sec and measuring the outgoing velocity and determining the percentage of the outgoing velocity relative to the incoming velocity.

As used herein, the term "copolymer" refers to a polymer which is formed from two or more monomers, wherein said monomers are not identical.

As used herein, the term "terpolymer" refers to a polymer which is formed from three monomers, wherein said monomers are not identical.

As used herein, the term "pph" in connection with a batch formulation refers parts by weight of the constituent per hundred parts of the base composition (e.g. elastomer).

The term "about," as used herein in connection with one or more numbers or numerical ranges, should be understood to refer to all such numbers, including all numbers in a range.

The present invention is directed to an improved multi-layer golf ball 1 which comprises a core 2, a cover 3, and at least one intermediate layer 4 disposed between the core and the cover, wherein such golf ball provides a softer feel similar to a conventional wound ball, while also providing the distance, durability, spin rates and ease of manufacturing of a conventional two-piece ball. The cover is formed of at least two layers, for example, inner and outer cover layers. As discussed in detail below, the improved multilayer golf ball of the present invention is provided by forming a ball having various structural components (e.g. cover, core, intermediate layer) each having desired properties and which may be formed from a variety of materials.

Many conventional two-piece "distance" golf balls are formed with cores having a high compression (e.g., greater than about 90) in order to achieve the desired high finished ball COR and initial velocity necessary to obtain long overall distance for the ball. Balls having such high compression cores typically have a hard feel when struck with a golf club.

However, the golf balls of the present invention are formed with a core having a low compression, but still exhibit a finished ball COR and initial velocity approaching that of conventional two-piece distance balls. Preferably, the cores employed in the golf balls of the present invention have a compression of less than about 60, more preferably about 45 to about 60 and most preferably about 50 to 55. Likewise, it is preferred that the finished balls made with such cores have a COR, measured at an inbound speed of 125 ft./sec., of greater than about 0.79, more preferably greater than about 0.8.

Additionally, it is preferred that the core has a Shore C hardness of about 65 to about 80, more preferably about 65 to about 75. Preferably, the core has a Shore D hardness of about 35 to 45 and preferably within 10 Shore D of the Shore D hardness of the intermediate layer.

The cores employed in the golf balls of the present invention preferably have a diameter of about 1.25 inches to about 1.60 inches, and more preferably when incorporating a cover and an intermediate layer, about 1.30 inches to about 1.48 inches and most preferably about 1.39 inches. The overall diameter of the core and the intermediate layer is about 85 percent to about 97 percent of the overall diameter of the finished ball.

A representative base composition for forming the cores employed in the present invention comprises polybutadiene and, in parts by weight based on 100 parts polybutadiene, 20–50 parts of a metal salt of an α,β-unsaturated carboxylic acid, such as diacrylate, dimethacrylate, or monomethacrylate. Preferably, the metal salt of an α,β-unsaturated carboxylic acid is zinc diacrylate. The polybutadiene preferably has a cis-1,4 content of above about 90% and more preferably above about 96%. Commercial sources of polybutadiene include SHELL 1220 manufactured by Shell Chemical, NEOCIS BR40 manufactured by Enichem Elastomers, and UBEPOL BR150 manufactured by Ube Industries, Ltd. If desired, the polybutadiene can also be mixed with other elastomers known in the art, such as natural rubber, styrene butadiene, and/or isoprene rubber in order to further modify the properties of the core. When a mixture of elastomers is used, the amounts of other constituents in the core composition are usually based on 100 parts by weight of the total elastomer mixture.

Metal salt diacrylates, dimethacrylates, and monomethacrylates suitable for use in the cores employed in this invention include those wherein the metal is magnesium, calcium, zinc, aluminum, sodium, lithium or nickel. Zinc diacrylate is preferred, because it provides golf balls with a high initial velocity in the USGA test. The zinc diacrylate can be of various grades of purity. For the purposes of this invention, the lower the quantity of zinc stearate present in the zinc diacrylate the higher the zinc diacrylate purity. Zinc diacrylate containing less than about 10% zinc stearate is preferable. More preferable is zinc diacrylate containing about 4–8% zinc stearate. Suitable, commercially available zinc diacrylates include those from Sartomer. The preferred concentrations of zinc diacrylate that can be used are 20–50 pph based upon 100 pph of polybutadiene or alternately, polybutadiene with a mixture of other elastomers that equal 100 pph.

Free radical initiators are used to promote cross-linking of the metal salt diacrylate, dimethacrylate, or monomethacrylate and the polybutadiene. Suitable free radical initiators for use in the invention include, but are not limited to peroxide compounds, such as dicumyl peroxide, 1,1-di(t-butylperoxy) 3,3,5-trimethyl cyclohexane, bis(t-butylperoxy) diisopropylbenzene, 2,5-dimethyl-2,5 di(t-butylperoxy) hexane, or di-t-butyl peroxide, and mixtures thereof. Other useful initiators would be readily apparent to one of ordinary skill in the art without any need for experimentation. The initiator(s) at 100% activity are preferably added in an amount ranging between about 0.05 and 2.5 pph based upon 100 parts of butadiene, or butadiene mixed with one or more other elastomers. More preferably, the amount of initiator added ranges between about 0.15 and 2 pph and most preferably between about 0.25 and 1.5 pph.

Typical prior art golf ball cores incorporate 5 to 50 pph of zinc oxide or calcium oxide in a zinc diacrylate-peroxide cure system that cross-links polybutadiene during the core molding process. In the present invention it is preferred that the zinc oxide ("ZnO") in the core composition or calcium oxide ("CaO") is used in a sufficient amount to maintain a core compression of less than about 60.

Typically the zinc oxide or calcium oxide added to the core-forming composition employed in the present invention is in the range of about 0.1 to 15, preferably 1 to 10, most preferably 1.25 to 5, parts zinc oxide or calcium oxide per hundred parts (pph) of polybutadiene.

The core compositions employed in the present invention may also include fillers, added to the elastomeric composition to adjust the density and/or specific gravity of the core. As used herein, the term "fillers" includes any compound or composition that can be used to vary the density and other properties of the subject golf ball cores. Fillers useful in the golf ball core according to the present invention include, for example, zinc oxide, barium sulfate, Polywate, and regrind (recycled core molding matrix ground to 30 mesh particle size). The amount and type of filler utilized is governed by the amount and weight of other ingredients in the composition, since a maximum golf ball weight of 1.620 ounces (45.92 gm) has been established by the USGA. Appropriate fillers generally used range in specific gravity from about 2.0 to 5.6. In the preferred golf ball, the amount of filler in the core is lower than that of a typical golf ball such that the specific gravity of the core is decreased.

The preferred range of specific gravities of the cores employed in the present invention is from about 1.0 to about 1.2, more preferably in the range of about 1.1 to about 1.18, depending upon the size of the core, cover, intermediate layer and finished ball, as well as the specific gravity of the cover and intermediate layer.

Other ingredients such as accelerators, e.g. tetra methylthiuram, processing aids, processing oils, plasticizers, dyes and pigments, antioxidants, as well as other additives well known to the skilled artisan may also be used in the present invention in amounts sufficient to achieve the purpose for which they are typically used.

The intermediate layer or cover inner layer of the golf balls of the present invention are formed from a blend which includes a thermoplastic, injection-moldable polyurethane. As set forth above, the intermediate layer is a composition including a polyether urethane derived from a diisocyanate reacted with a hydroxyl terminated polyether and a glycol chain extender composition blended with a thermoplastic selected from the group of copolyesters, polyamides, polyetherester block copolymers, polyesterester block copolymers, polyetheramide block copolymers, polyesteramide block copolymers, and other polyurethane such as poly(p-phenylene diisocyanate-ether) urethane and polyester-type urethane, wherein the resulting material has a flexural modulus less than 20,000 psi. The hydroxyl terminated polyether has alkylene oxide repeat units containing from 2 to 6 carbon atoms and a weight average molecular weight of at least 1,400.

The hydroxyl terminated polyether intermediate preferably contains an alkylene oxide repeat group with 2 to 6 carbon atoms such as ethylene oxide or propylene oxide with 4 carbon atoms. Tetramethylene or butylene oxide being the most preferred. The polyether intermediate is preferably a homopolymer with a molecular between 1400 and 10,000 and more preferably between 2,500 and 10,000. Such hydroxyl terminated polyethers are commercially available and include Polymeg 2000 from Quaker Oats and Terethane 2900 from DuPont for example.

The diisocyanate is preferably an aromatic diisocyanate. The diisocyanate preferably contains between 4 and 20 carbon atoms. Examples include 1,4-diisocyanatobenzene (PPDI), 1,5-naphthalene diisocyanate, xylene diisocyanate, isomers of toulene diisocyanate, or most preferably, 4,4'methylenebis(phenylisocyanate), isomers thereof or oligomers thereof. Acceptable aliphatic diisocyanates include hexamethylene, isophorone diisocyanate, methalene bis(4-cyclohexylisocyanate) 1,4-cyclohexyl diisocyanate and the like.

The glycol chain extenders are preferably straight chain and crystalline. The total weight of any branches of the chain extenders based on all of the weight of all the chain extenders is less than 15% by weight. The chain extenders can be aliphatic, but aromatic glycol chain extenders are preferred. Suitable glycol chain extenders include glycol, ethylene glycol, propane glycol, butane glycol, pentane glycol, hexane glycol, benzene glycol and xylenene glycols.

The most preferred polyether-type polyurethanes are available from B. F. Goodrich under the names ESTANE 5740X820 and 5740X955. Both materials having a Shore D hardness of less than 30, a flexural modulus of less than 5,000 psi and a percent rebound resilience of greater than 70%.

As stated above, in a preferred embodiment of the present invention, the intermediate layer is formed from a blend which comprises the polyether-type polyurethane and a second component which comprises a thermoplastic material. Suitable thermoplastic materials for use in the intermediate blend include, but are not limited to, polyesterester block copolymers, polyetherester block copolymers, polyetheramide block copolymers, ionomer resins, dynamically vulcanized thermoplastic elastomers, hydrogenated styrene-butadiene elastomers with functional groups such as maleic anhydride or sulfonic acid attached, thermoplastic polyurethanes, thermoplastic polyesters, polymers formed using a metallocene catalyst ("metallocene polymers") and/or blends thereof.

Suitable thermoplastic polyetheresters include materials which are commercially available from DuPont of Wilmington, Del., under the tradename HYTREL and include HYTREL 3078, HYTREL G3548W, HYTREL 4069 and HYTREL G4078W. Suitable thermoplastic polyetheramides are commercially available from Elf-Atochem of Philadelphia, Pa., under the tradename PEBAX and include PEBAX 2533, PEBAX 1205 and PEBAX 4033. Suitable thermoplastic ionomer resins include any number of olefinic based ionomers such as SURLYN (DuPont) and IOTEK (Exxon). Suitable dynamically vulcanized thermoplastic elastomers include SANTOPRENE, SARLINK, VYRAM, DYTRON, and VISTAFLEX. SANTOPRENE is the trademark for a dynamically vulcanized PP/EPDM. SANTOPRENE 203-40 is an example of a preferred SANTOPRENE and is commercially available from Advanced Elastomer Systems. Examples of suitable functionalized hydrogenated styrene-butadiene elastomers having functional groups such as maleic anhydride or sulfonic acid, include KRATON FG-1901x and FG-1921x, which are commercially available from the Shell Corporation. Examples of suitable thermoplastic polyurethanes include ESTANE 58133, ESTANE 58134 and ESTANE 58144, which are commercially available from the B. F. Goodrich Company of Cleveland, Ohio. Suitable metallocene-catalyzed polymers, i.e., polymers formed with a metallocene catalyst, include those commercially available from EXXON and DOW. Suitable thermoplastic polyesters include poly(butylene terephthalate), poly(ethylene terepthalate), and poly(trimethylene terpthalate).

The blend can also include a foaming agent or microspheres such as hollow, resilient microspheres or glass microspheres as a density decreasing filler.

Preferably, the second component of the intermediate layer blend comprises polyetherester block copolymer, with HYTREL 4069 being a particularly preferred polyetherester block copolymer.

Generally, many prior art intermediate layers have a specific gravity of about 1 or less. However, in a preferred embodiment, the intermediate layer employed in the golf balls of the present invention has a specific gravity greater than 1.2, preferably about 1.21 to about 1.30, more preferably about 1.23 to about 1.29 and most preferably about 1.27.

The desired specific gravity of the intermediate layer may be obtained by adding a filler such as barium sulfate, zinc oxide, titanium dioxide and combinations thereof to the intermediate layer blend. Zinc oxide is the preferred filler.

The intermediate layers of the present invention are formed from an intermediate layer blend comprising up to 100 percent by weight of the polyether-type a polyurethane. In a preferred embodiment of the present invention, the intermediate layer is formed from a blend of about 20 to about 90 percent by weight of a polyether-type polyurethane, about 0 to about 50 percent by weight of the second thermoplastic component (as describe above) and about 0 to about 40 percent by weight of a filler such as zinc oxide. In one embodiment of the present invention, the intermediate layer is formed from a blend of about 30 to 60 percent by weight of a polyether-type polyurethane, 20 to 40 percent by weight of a second thermoplastic component and about 5 to about 40 percent by weight of a filler such as zinc oxide. In a most preferred embodiment of the present invention, the intermediate layer is formed from a blend of about 45 to about 50 percent by weight polyether-type polyurethane, about 30 to about 35 percent by weight of a second thermoplastic component and about 17 to about 22 percent by weight of a filler.

The intermediate layer blend preferably has a flexural modulus of less than about 10,000 psi, more preferably about 2,000 to about 8,000 psi. Likewise, the intermediate layers employed in the golf balls of the present invention preferably have a Shore D hardness of about 20 to 40, and more preferably about 27 to about 33. The intermediate layer blend preferably has a Shore C hardness of about 40 to 60 and more preferably from about 50 to 60.

The intermediate layers employed in the golf balls of the present invention preferably have a thickness from about 0.02 inches to about 0.12 inches, more preferably about 0.03 inches to about 0.08 inches and most preferably about 0.06 inches The outer diameter of the intermediate layer is preferably about 1.5 to 1.6 inches.

The cover layer of the present invention comprises at least one layer of a thermoplastic or thermosetting material. Any number of a wide variety of cover materials may be used in the present invention, such as ionomer resins, polyurethanes, balata and blends thereof, with ionomer resins being preferred.

Ionomers, such as acid-containing ethylene copolymer ionomers, include E/X/Y copolymers or terpolymers where E is ethylene, X is a softening comonomer such as acrylate or methacrylate present in 0–50 (preferably 0–25) weight percent of the polymer, and Y is acrylic or methacrylic acid present in 5–35 (preferably 10–35, most preferably 15–20) weight percent of the polymer, wherein the acid moiety is neutralized 1–90% (preferably at least 40%, most preferably at least about 60%) to form an ionomer by a cation such as lithium, sodium, potassium, magnesium, calcium, barium, lead, tin, zinc or aluminum, or a combination of such cations, lithium, sodium and zinc being the most preferred. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

The manner in which these ionomers are made is well known in the art as described in e.g. U.S. Pat. No. 3,262,272. As mentioned above, ionomer resins are commercially available from DuPont of Wilmington, Del., under the tradename SURLYN, and Exxon under the tradename IOTEK.

As is well known in the art, ionomer resins may be blended in order to obtain a cover having desired characteristics. For this reason, it is preferable that the covers of the golf balls of the present invention be formed from a blend of two or more ionomer resins. A particularly preferred cover material for use in the present invention is formed from a blend of about 48 percent by weight SURLYN 7940, about 48 percent by weight SURLYN 8940 and about 4 percent by weight of $TiO_2$ color concentrate.

The cover layers employed in the present invention preferably have a Shore D hardness of about 54 to about 72, more preferably about 65 to about 70 and most preferably about 68 to about 70.

It should be understood that the composition of any of the above layers, such as core layers, intermediate or mantle layers, or cover layers, may include additives, such as pigments, foaming agents, inert/reactive fillers, including ceramic spheres, glass spheres, etc., as would be readily determined by one of ordinary skill in the art.

The multi-layer golf ball of the invention can have an overall diameter of any size. Although the United States Golf Association (USGA) specifications limit the minimum size of a competition golf ball to 1.680 inches in diameter or more, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

The preferred golf balls of the present invention have an overall maximum compression of about 90, more preferably about 75 to about 85.

The golf balls of the present invention can be made by any conventional processes employed in the golf ball art. For example, the solid cores can be either injection or compression molded. Preferably, the cores are compression molded as set forth in U.S. Pat. No. 4,389,365. The intermediate layer is subsequently injection or compression molded about the core. It is important that the intermediate layer material be able to sustain the temperatures applied during the application of the cover layer. However, it is most preferred that the intermediate layer is injection molded at a temperature below 400° F. The cover layer or layers are then injection or compression molded or cast about the intermediate layer. Most preferably, the cover is compression molded over the intermediate layer.

EXAMPLES

The cores of multi-layer balls were formed by compression molding a blend of the batch formulation set forth in Table I below.

TABLE I

Core Batch Formulation

| Material | Parts Per Hundred |
| --- | --- |
| Polybutadiene (Cariflex 1220) | 76.0 |
| Rubber (Neocis BR-40) | 24.0 |
| Pigment | .03 |
| Zinc Diacrylate | 25.3 |
| Zinc Oxide | 2.1 |
| Regrind | 6.5 |
| Peroxide (Varox 231 XL) | 0.43 |
| Peroxide (Elastochem DBDB EF-60) | 0.16 |
| Density Adjusting Filler | 22.6 |

All of the cores had a diameter of about 1.39 inches and were measured to have compressions ranging from about 47 to 53 and specific gravities of from about 1.138 to 1.156. For the above core batch formulation, the resultant cores were measured to have a compression of 50. The intermediate layer blends of Table 2 were subsequently injection molded about the cores of Table 1 at a temperature of about 375° F. to form the intermediate layers of the balls having an outer diameter of about 1.51 inches.

TABLE II

Intermediate Layer Formulation

| Formulation | Example 1 (weight %) | Example 2 (weight %) |
| --- | --- | --- |
| Hytrel 3078[1] | 32 | — |
| Hytrel 4069[1] | — | 32 |
| Zinc oxide | 20 | 20 |
| ESTANE 5740 x 820 | 48 | 48 |

[1]block copoly(ether-ester) elastomer, from DuPont.

All of the multi-layer balls had a cover composition formed by compression molding a blend comprising about 50% SURLYN 7940 and 50% SURLYN 8940 and a sufficient amount of titanium dioxide concentrate about the intermediate layers and were subsequently finished using conventional clear coating and buffing techniques. The finished golf balls had an outer diameter of just greater than 1.68 inches. These balls were tested for initial velocity, compression, cover hardness, and COR, the results of such tests are set forth in Table 3 below.

As can be seen in Table 3, both mantle layers and golf balls prepared according to the present invention, shown as the compositions presented in Examples 1–3 in Table 2 above, exhibit low compression, i.e., soft "feel", while retaining high initial velocity or COR.

TABLE III

Mantle Layer and Ball Properties

|  | Example 1 | Example 2 |
|---|---|---|
| Mantle Properties | | |
| Hardness[1] | 30 | 30 |
| Compression | 49 | 52 |
| COR[2] | 0.763 | 0.762 |
| Ball Properties | | |
| Cover Hardness[1] | 67 | 67 |
| Compression | 80 | 81 |
| COR[2] | 0.794 | 0.793 |

[1]Shore D hardness
[2]Adjusted COR at 125 ft/s incoming velocity

While it is apparent that the illustrative embodiments of the invention herein disclosed fulfill the objectives stated above, it will be appreciated that numerous modifications and other embodiments may be devised by those skilled in the art. Therefore, it will be understood that the appended claims are intended to cover all such embodiments that come within the spirit and scope of the present invention.

We claim:

1. A golf ball comprising:
    a core having a compression of no greater than about 90; and
    a cover having at least one layer being formed from a blend comprising:
        a polyether-type thermoplastic polyurethane having a percent rebound resilience of greater than 60 such that the golf ball has a coefficient of restitution of greater than about 0.76; and
        a second thermoplastic component selected from the group consisting of polyesterester block copolymers, polyetherester block copolymers, polyetheramide block copolymers, dynamically vulcanized thermoplastic elastomers, styrene-butadiene elastomers, other thermoplastic polyurethanes, thermoplastic polyesters, polymers formed using a metallocene catalyst, and blends thereof.

2. The golf ball of claim 1, wherein the golf ball has a compression of no greater than about 90.

3. The golf ball of claim 1, wherein the cover comprises a second layer of at least one of a thermoplastic or a thermoset material.

4. The golf ball of claim 1, wherein the second component comprises a polyetherester block copolymer.

5. The golf ball of claim 1, wherein the blend further comprises a density adjusting filler in an amount sufficient to provide the at least one layer with a specific gravity of greater than about 1.2.

6. The golf ball of claim 5, wherein the at least one layer has a specific gravity of greater than about 1.25.

7. The golf ball of claim 6, wherein the density adjusting filler comprises zinc oxide.

8. The golf ball of claim 1, wherein the blend comprises about 20 to 90 percent by weight of the polyether-type polyurethane and about 5 to 50 weight percent of the second thermoplastic component.

9. The golf ball of claim 8, wherein the blend comprises about 30 to 60 percent by weight of the polyether-type polyurethane and about 20 to 40 weight percent of the second thermoplastic component.

10. The golf ball of claim 8, wherein the blend further comprises about 5 to 40 percent by weight of a filler material.

11. The golf ball of claim 1, further comprising an intermediate layer, wherein the intermediate layer has a Shore D hardness of about 25 to 50 and a flexural modulus of about 1,000 psi to 8,000 psi.

12. A golf ball comprising:
    a core comprising polybutadiene;
    a cover layer having a Shore D hardness of about 54 to 72; and
    at least one intermediate layer disposed between the cover and the core, wherein
        the intermediate layer has a Shore D hardness of less than about 40 and a flexural modulus of less than about 10.000 psi and wherein the at least one intermediate layer is formed from a blend comprising polyether-type polyurethane and a second thermoplastic component, and
    wherein the golf ball has a coefficient of restitution of greater than about 0.78.

13. The golf ball of claim 12, wherein the intermediate layer is formed from a blend comprising:
    about 30 to 60 percent by weight of the polyether-type polyurethane;
    about 15 to 30 weight percent filler material; and
    about 20 to 40 weight percent of a block copolymer.

14. The golf ball of claim 12, wherein the blend comprises less than about 40 weight percent polyetherester block copolymer.

* * * * *